US012507799B2

(12) United States Patent
Klinkenberg et al.

(10) Patent No.: US 12,507,799 B2
(45) Date of Patent: Dec. 30, 2025

(54) FRONT PANEL FOR A FURNITURE BODY

(71) Applicant: PRONORM EINBAUKÜCHEN GMBH, Vlotho (DE)

(72) Inventors: Roger Klinkenberg, Voerendaal (NL); Thorsten Gösling, Bad Salzuflen (DE)

(73) Assignee: Pronorm Einbauküchen GmbH, Vlotho (DE)

( * ) Notice: Subject to any disclaimer, the term of this patent is extended or adjusted under 35 U.S.C. 154(b) by 25 days.

(21) Appl. No.: 18/573,738

(22) PCT Filed: Jun. 22, 2022

(86) PCT No.: PCT/DE2022/000071

§ 371 (c)(1),
(2) Date: Dec. 22, 2023

(87) PCT Pub. No.: WO2022/268247

PCT Pub. Date: Dec. 29, 2022

(65) Prior Publication Data

US 2024/0298796 A1 Sep. 12, 2024

(30) Foreign Application Priority Data

Jun. 24, 2021 (DE) ..................... 10 2021 003 238.1

(51) Int. Cl.
*A47B 95/02* (2006.01)
*A47B 88/919* (2017.01)
(Continued)

(52) U.S. Cl.
CPC ............ *A47B 95/02* (2013.01); *A47B 88/919* (2017.01); *F21S 4/28* (2016.01); *F21V 21/40* (2013.01);
(Continued)

(58) Field of Classification Search
CPC . A47B 95/02; A47B 88/919; A47B 2095/024; A47B 2220/005;
(Continued)

(56) References Cited

U.S. PATENT DOCUMENTS 4,096,603 A * 6/1978 Klaus ........................ G09F 3/20 16/416
4,574,424 A * 3/1986 Reis ....................... A47B 95/02 16/DIG. 24
(Continued)

FOREIGN PATENT DOCUMENTS

BE 1028838 A1 * 6/2022
CN 202731423 U 2/2013
(Continued)

*Primary Examiner* — Jason W San
*Assistant Examiner* — Matthew J Sullivan
(74) *Attorney, Agent, or Firm* — Laurence A. Greenberg; Werner H. Stemer; Ralph E. Locher

(57) ABSTRACT

A front panel for a furniture body allows an end face of movable furniture parts provided with a handle bar or strip to be gripped from behind. The front panel has a chamber accommodating a lighting device. The one-piece front panel has a base plate, in front of which a wall with multiple curvatures is connected. A first end portion of the wall extends from the movable furniture part in the direction of the body interior as far as the base plate. After a change of direction, a second end portion of the wall supports the chamber for accommodating the lighting device at a distance from the base plate. The chamber remains visible when the furniture body is viewed from the front. The wall forms a rear wall of the chamber and the rear wall faces the furniture body. A furniture piece with a front panel is also provided.

10 Claims, 3 Drawing Sheets

(51) Int. Cl.

| | |
|---|---|
| ***F21S 4/28*** | (2016.01) |
| ***F21V 21/40*** | (2006.01) |
| ***F21V 33/00*** | (2006.01) |
| *F21W 111/08* | (2006.01) |
| *F21W 131/301* | (2006.01) |
| *F21Y 103/10* | (2016.01) |
| *F21Y 115/10* | (2016.01) |

(52) U.S. Cl.
CPC .... *F21V 33/0012* (2013.01); *A47B 2095/024* (2013.01); *A47B 2220/005* (2013.01); *A47B 2220/0075* (2013.01); *F21W 2111/08* (2013.01); *F21W 2131/301* (2013.01); *F21Y 2103/10* (2016.08); *F21Y 2115/10* (2016.08)

(58) Field of Classification Search
CPC .............. A47B 2220/0075; F21S 4/28; F21W 2111/08; F21W 2131/301; F21V 33/0012; F21V 21/40; F21Y 2103/10; F21Y 2115/10
See application file for complete search history.

(56) References Cited

U.S. PATENT DOCUMENTS

| | | | | |
|---|---|---|---|---|
| 5,001,877 | A * | 3/1991 | Edwards | E04F 19/0436 403/295 |
| 5,457,923 | A * | 10/1995 | Logan | E04F 19/0436 52/287.1 |
| 5,711,123 | A * | 1/1998 | Lamont | E04F 19/0481 52/312 |
| 5,984,486 | A * | 11/1999 | Munz | F21V 21/02 211/186 |
| 6,135,621 | A * | 10/2000 | Bach | F21V 33/006 74/543 |
| 6,325,523 | B1 * | 12/2001 | Santosuosso | F21V 5/04 362/125 |
| 6,461,023 | B1 * | 10/2002 | McLoughlin | F21V 7/09 362/348 |
| 6,505,953 | B1 * | 1/2003 | Dahlen | F21V 15/01 362/217.08 |
| 6,755,551 | B2 * | 6/2004 | Soorus | F21V 15/01 362/217.05 |
| 7,156,694 | B1 * | 1/2007 | Anderson | H01R 25/16 439/535 |
| 7,600,888 | B1 * | 10/2009 | Miller | F21V 33/0012 362/217.08 |
| 7,824,055 | B2 * | 11/2010 | Sherman | A47F 11/10 362/127 |
| 7,958,685 | B2 * | 6/2011 | Rowohlt | E04F 19/0436 52/287.1 |
| 8,128,251 | B2 * | 3/2012 | Huang | G09F 3/204 362/125 |
| 8,696,154 | B2 * | 4/2014 | Hutchens | F21V 11/14 362/217.05 |
| D733,353 | S * | 6/2015 | Klus | D26/138 |
| 9,185,978 | B1 * | 11/2015 | Chen | A47B 95/02 |
| 9,435,498 | B1 * | 9/2016 | Anderson | F21V 21/025 |
| 9,480,346 | B2 * | 11/2016 | Houle | A47F 3/001 |
| 9,644,836 | B1 * | 5/2017 | Field | F21S 4/28 |
| 9,679,503 | B2 * | 6/2017 | Weyer | G09F 3/204 |
| 9,708,819 | B2 * | 7/2017 | Koenigsmark | E04F 19/0436 |
| 9,883,745 | B2 * | 2/2018 | Gonzales | A47B 95/00 |
| 9,903,125 | B2 * | 2/2018 | Hoffman | E04F 19/0486 |
| 10,082,227 | B2 * | 9/2018 | Hoffman | H02G 3/04 |
| 10,113,715 | B2 * | 10/2018 | Xue | A47B 96/027 |
| 10,151,472 | B2 * | 12/2018 | Zeng | F21V 33/0012 |
| 10,152,904 | B2 * | 12/2018 | Zeng | F21S 4/28 |
| 10,317,024 | B2 * | 6/2019 | Liu | F21V 7/04 |
| 10,330,270 | B1 * | 6/2019 | Brannon | F21S 8/03 |
| 10,676,941 | B1 * | 6/2020 | Hoffman | E04F 19/0436 |
| 11,140,980 | B2 * | 10/2021 | Breslow | A47B 57/58 |
| 11,191,359 | B2 * | 12/2021 | Siekmann | A47B 95/02 |
| 11,335,215 | B2 * | 5/2022 | Eden | G09F 3/204 |
| 11,808,419 | B1 * | 11/2023 | Chen | F21V 7/005 |
| D1,057,148 | S * | 1/2025 | Eves | D24/110.4 |
| 2010/0128480 | A1 * | 5/2010 | Watanabe | F21V 29/89 362/249.02 |
| 2010/0146737 | A1 * | 6/2010 | Kunnath | A47B 95/02 16/415 |
| 2014/0313722 | A1 * | 10/2014 | Eloff | F21S 4/22 362/418 |
| 2016/0377258 | A1 * | 12/2016 | Xu | F21V 5/04 362/223 |
| 2017/0336064 | A1 * | 11/2017 | Simon | F21S 4/28 |
| 2020/0170411 | A1 * | 6/2020 | Volkmann | A47B 95/02 |
| 2022/0151383 | A1 * | 5/2022 | Sponga | A47B 96/021 |
| 2024/0225279 | A1 * | 7/2024 | Klinkenberg | F21V 33/0012 |

FOREIGN PATENT DOCUMENTS

| | | | | |
|---|---|---|---|---|
| CN | 203646764 U | | 6/2014 | |
| CN | 106931711 A | | 7/2017 | |
| DE | 10064716 A1 | | 6/2002 | |
| DE | 102005027200 A1 | | 2/2007 | |
| DE | 202018101927 U1 | | 5/2018 | |
| EP | 3967183 A1 | | 3/2022 | |
| EP | 4434398 A1 | * | 9/2024 | A47B 95/02 |
| KR | 200457121 Y1 | | 12/2011 | |
| WO | 2013126946 A1 | | 9/2013 | |
| WO | 2019197092 A1 | | 10/2019 | |

* cited by examiner

FRONT PANEL FOR A FURNITURE BODY

FIELD AND BACKGROUND OF THE INVENTION

The invention concerns a front panel for a furniture body, which front panel allows gripping from behind of an end face, provided with a handle bar, of movable furniture parts such as doors, drawers or similar, and has a chamber for receiving a lighting means.

For many years, handles on furniture have been used not only as handles for actuating drawers, doors, flaps or similar, but also as a styling means for visual enhancement of a furniture front. The appearance of a furniture front is today often improved by the use of handle bars which extend in particular over the entire width of such a movable furniture part.

As well as handles which are directly connected to movable furniture parts such as doors, drawers or similar for actuation thereof, illuminated front panels have become known which are set back from the front side of the furniture body and allow gripping from behind of an end face of these movable furniture parts equipped with a handle bar.

SUMMARY OF THE INVENTION

It is accordingly an object of the invention to provide a front panel for a furniture body, which overcomes the disadvantages of the heretofore-known devices of this general type with regard to production costs in unlimited lengths e.g. of plastic or metal e.g. high quality aluminum.

The invention provides a device of the type described initially for actuation of movable furniture parts, wherein it is provided that the one-piece front panel has a base plate, in front of which a wall with multiple curvature is connected, a first end portion of which extends from the movable furniture part in the direction of the body interior as far as the base plate and which, after a direction change, carries on its second end portion, spaced from the base plate, the chamber which receives the lighting means and remains visible when the furniture body is viewed from the front, and that the wall forms a rear wall of the chamber facing the furniture body.

The one-piece design of the front panel allows low-cost production in unlimited lengths e.g. of a plastic, in some cases however also of a metal e.g. of high quality aluminum.

The light from the lighting means incident on the front side of the wall creates a light band which extends in particular over the entire width of the furniture part, in particular also over an entire furniture piece. Since the front panel is at least partially set back relative to the furniture front, the end portion of the wall, running initially from the movable furniture part in the direction of the body interior, largely prevents a light incidence into the interior of the furniture or backlighting of the movable furniture part, while the base plate closes the interior of the furniture body and prevents light incidence.

Thanks to the curved wall, the light passing through the light outlet opening of the chamber for receiving the lighting means is also guided along the wall up to the handle bar, and safely illuminates the space between the handle bar of the movable furniture part and the wall.

The provision of the base plate stabilizes the front panel according to the invention. If such a base plate is also made sufficiently stable, it may be considered to make the preferably extending horizontally front panel self-supporting, merely resting on the end faces of corner recesses in the side parts of the furniture body.

It may be provided that the wall and the base plate are formed in common in portions.

Structurally, it is furthermore advantageous if the wall forms a rear wall of the chamber facing the furniture body.

To fasten the front panel to the furniture body, normal connecting techniques such as screwing, gluing or similar are quite suitable. Suitably, locking or spacing elements for fastening to the furniture body protrude from the back of the base plate.

Suitably, locking or spacer elements with L-shaped and/or T-shaped cross-section protrude from the base plate for fastening to the furniture body. Such locking, e.g. by pressing into corresponding grooves of the furniture part, in some cases of one or more mounting plates, ensures not only a secure but also an invisible fastening. Configured as spacer elements, these elements define the position of the front panel e.g. in a groove in the body. In addition, such locking or spacer elements with L-shaped and/or T-shaped cross-section act as a bead to reinforce the base plate.

It has furthermore proved suitable if the chamber is covered by an upper part connected to an edge of the base plate, and a front wall of the chamber is extended up to a free end of the upper part or beyond the upper part to the underside of a cover plate of the furniture body.

Such measures provide a closed front appearance and achieve a high mechanical stability.

If furthermore the wall is extended beyond the upper part up to the underside of a cover plate of the furniture body, a space is created between the upper part and the underside of the cover plate, which may be used for example for cutouts for ventilation of cook tops, ovens or similar.

In the structural design, it may be provided that the end portion of the wall lying opposite the chamber has an S-shaped curve. This gives the end portion of the wall substantial stiffness and allows a floor part to be attached between this end portion of the wall and the base plate.

The light guidance along the wall is further improved if a light outlet opening of the chamber, standing perpendicularly on the wall, is closed by a strip of a transparent material which has a triangular cross-section.

The strip of transparent material protects the lighting means from dirt and is however easy to clean, for example when used in a kitchen area, in order to guarantee optimal light output. Because of the triangular cross-section, furthermore the strip acts as a light guide for bundling incident light.

Structurally, it may be provided that the strip and/or an LED band is/are held in grooves in opposite walls of the chamber, and/or that lugs protrude from the opposite walls and engage in grooves of the strip and/or LED band.

Even if LED bands, which have a comparatively long life, are used as lighting means, nonetheless replacement is easily possible via the end faces of the front panel according to the invention, perhaps after removing a cover cap.

The same applies to the strip of transparent material, for example after scratching or denting. Also, a color change is easily possible by replacing the LED band and/or the strip.

Such measures provide a closed front appearance and achieve a high mechanical stability.

The resulting furniture piece with a front panel according to the invention, having a handle bar made of a solid profile which has a grip recess and is inserted in a rectangular corner cutout in an end face of the movable furniture part, and which furthermore has a lug extending over the end face and engages with an underside locking element in the furniture part, meets the highest requirements.

The device according to the invention is explained in more detail with reference to the drawing which shows merely exemplary embodiments.

DETAILED DESCRIPTION OF THE INVENTION

Figure 1:
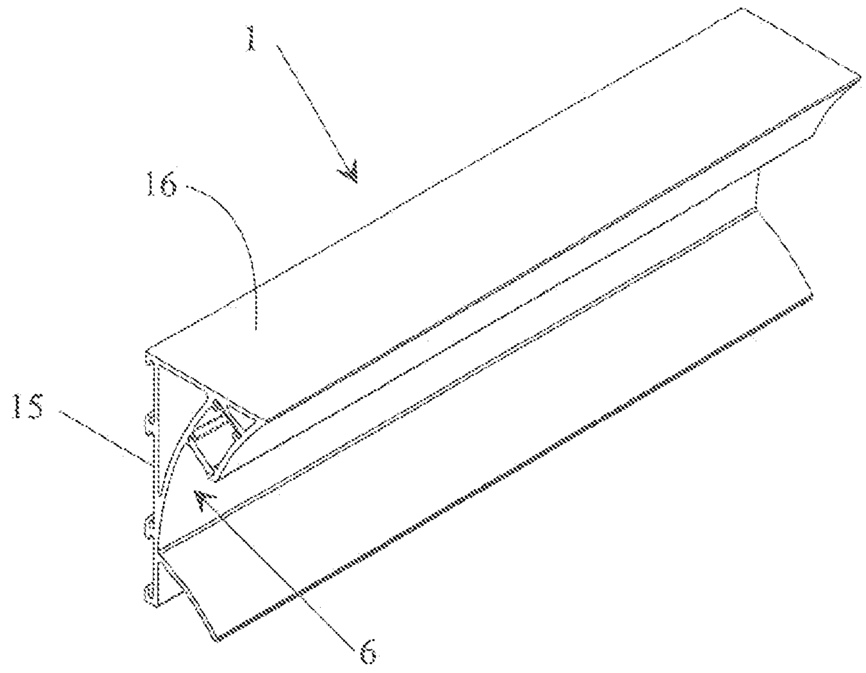
FIG. 1 shows an isometric view of a first embodiment of a front panel.
Figure 2:
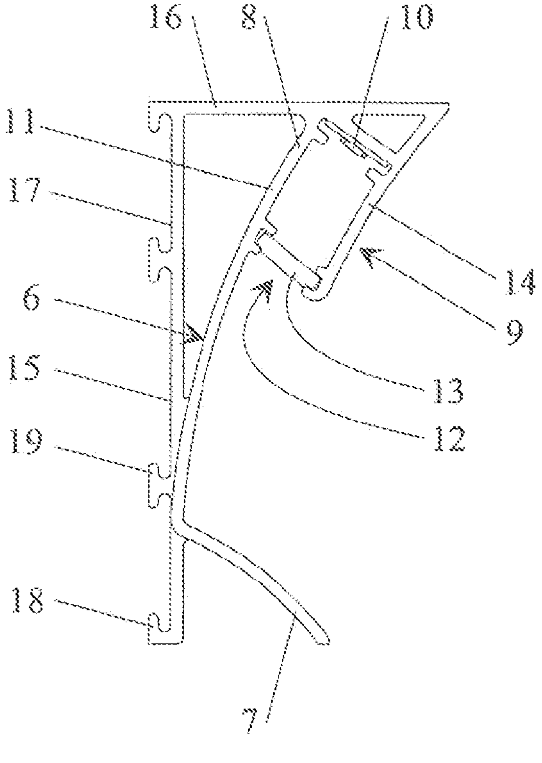
FIG. 2 shows a view onto the end face.
Figure 3:
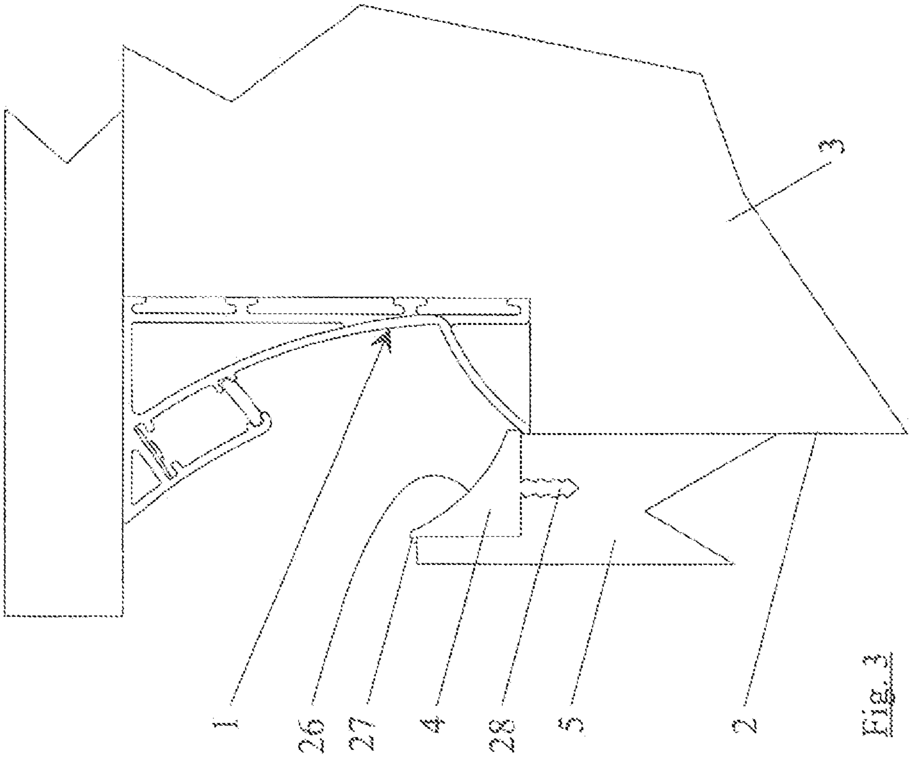
FIG. 3 shows an illustration of the installation situation of the first exemplary embodiment.

The one-piece front panel 1 illustrated in the drawing in FIGS. 1 to 3 is set back relative to a front side 2 of a furniture body 3 so far as to allow gripping from behind of a movable furniture part 5, such as a door, drawer or similar, which is provided with a handle bar 4 for actuation thereof, see FIG. 3.

The front panel 1 has a wall 6 with multiple curvature forming a spine, in front of a rear base plate 15, and a first end portion 7 thereof runs away from the movable furniture part 5 in the direction of the body interior.

After a direction change at the site of its connection to the base plate 15, the wall 6 carries, on its second end portion 8, a chamber 9 which remains visible in a front view of the furniture body 3 and receives a lighting means 10.

The rear wall 11 of the chamber 9 is formed by the wall 6, whereby the chamber 9 is held at a distance from the base plate 15 of the front panel 1.

The walls of the chamber 9 are opaque and leave a light outlet opening 12 which is closed by a strip 13 of a transparent material.

Thus the light from the lighting means 10 passes exclusively through the transparent strip 13 onto the wall 6, and illuminates the intermediate space between the handle bar 4 and the wall 6. Thus in front view, a light band appears over the length of the front panel 1. The end portion 7 prevents light incidence into the furniture body 3 or backlighting of the movable furniture part 5.

In the chamber 9, the strip 13 is held in grooves in the opposite walls 11, 14. The same applies to the LED band carrying the lighting means 10 at the end of the chamber 9 lying opposite the light outlet opening 12.

An upper part 16, which stands perpendicularly on the base plate 15, is connected to the upper edge of the base plate 15 and is dimensioned so that the wall 6 and chamber 9 are covered. The front wall 14 of the chamber 9 is extended to the end of the upper part 16, so that there a smooth front side of the front panel is formed.

In order to fasten the front panel 1 to the furniture body 3, L-shaped and T-shaped locking or spacer elements 18, 19 protrude from the back side 17 of the base plate 15 and can be pressed into corresponding grooves in a cross-piece of such a furniture body, in some cases into a separately formed fixing plate.

FIG. 3 furthermore shows a handle bar 4 made of a solid profile having a grip recess 26. The handle bar 4 is set into a rectangular corner cutout facing the furniture body in an end face of the movable furniture part 5, and has a lug 27 which engages over the end face of the furniture part 5. On the underside, a locking element 28 protrudes beyond the handle bar 4 and engages in the furniture part 5, e.g. in the form of a feather with sawtooth profile, which engages securely in an end face groove in the furniture part 5.

Figure 4:
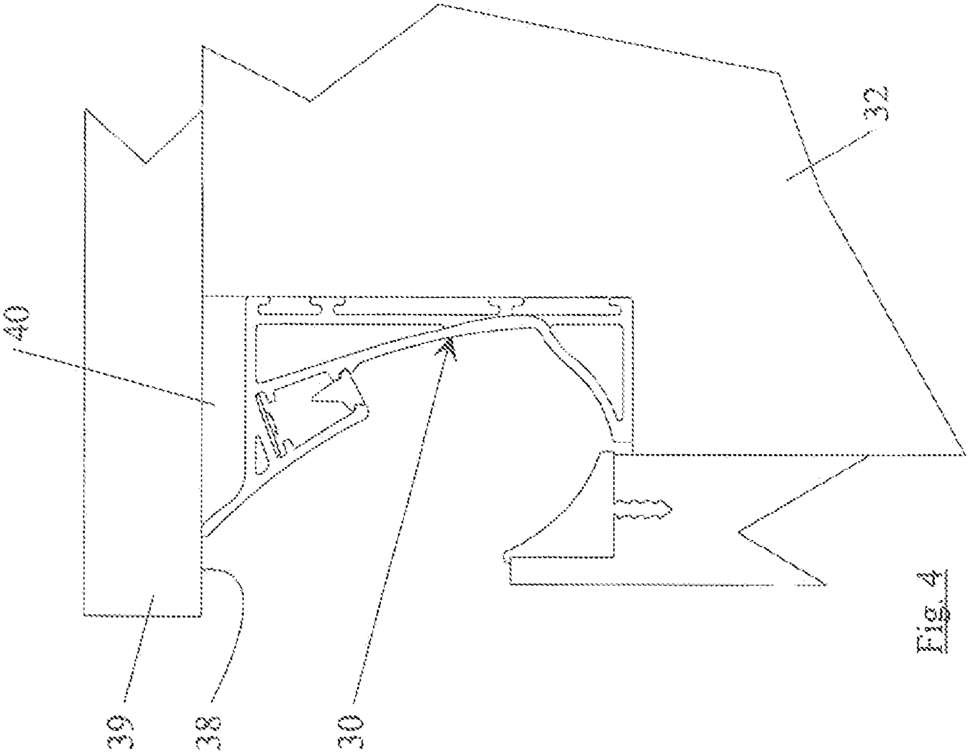
FIG. 4 shows an illustration of the installation situation of the second exemplary embodiment.
Figure 5:
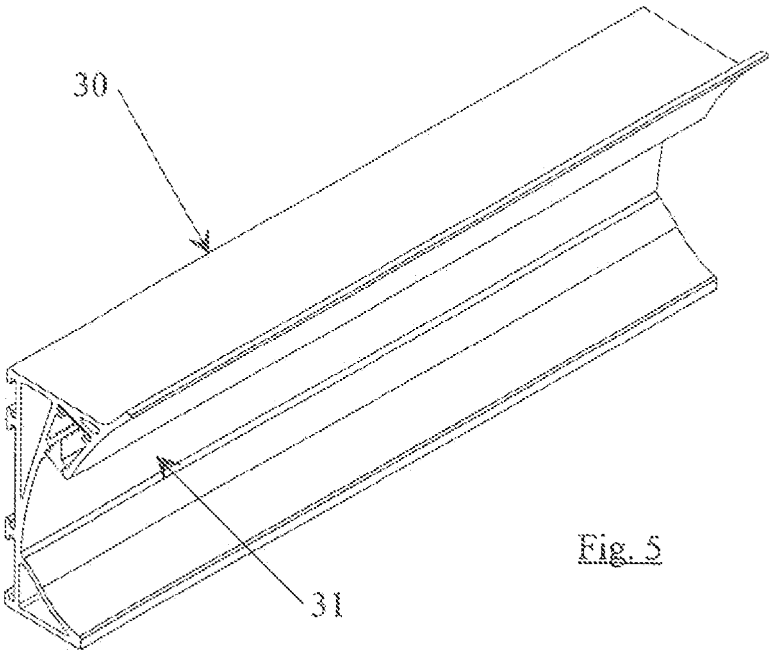
FIG. 5 shows an isometric illustration of the second exemplary embodiment of a front panel.
Figure 6:
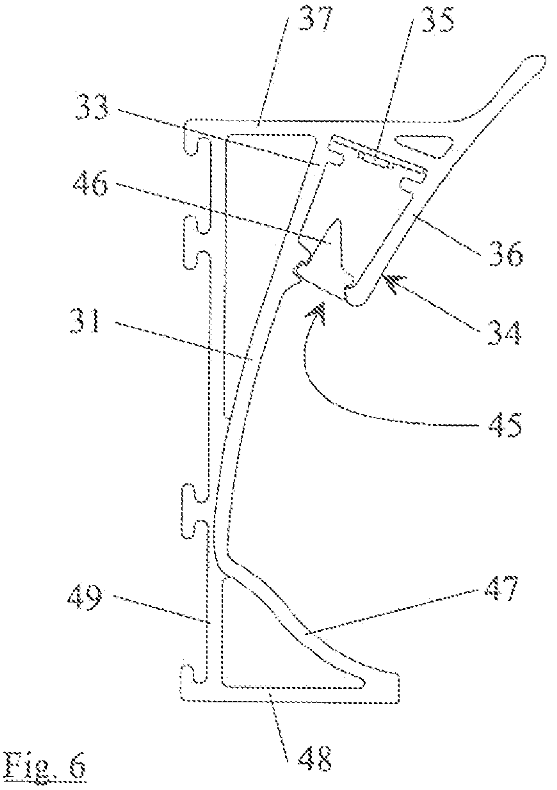
FIG. 6 shows an end view of the second exemplary embodiment of a front panel.

A further exemplary embodiment of a front panel 30 according to the invention is explained with reference to FIGS. 4 to 6. The front panel 30 shown there, like the exemplary embodiment presented above, has a wall 31 in front of a base plate 49, the end portion 33 of which pointing away from the furniture body 32 carries a chamber 34 with lighting means 35. In the front panel 30, the front wall 36 of the chamber 34 is extended beyond an upper part 37 which, formed flat, extends from the base plate 49 up to the wall 31, as far as the underside 38 of a cover plate 39 of the furniture body 32, so that a space 40 is formed between the upper part 37 and the inside 38 of the cover plate 39. This space 40 allows the routing of cables, the creation of cutouts for ventilation of cooktops, ovens or similar.

The light outlet opening 45 of the chamber 34 is closed by a transparent strip 46 with a triangular cross-section, the tip of which is directed towards lighting means 35. This geometry of the strip 46 also forms a light guide which ensures a very even light radiation onto the wall 31.

At the side of the wall 31, the strip 46 is held with a protrusion in a groove. The other side of the strip however has a groove in which a lug of the front wall 36 engages. This fastening allows simple clip-mounting of the strip 46.

The second end portion 47 of the wall 31 has an S-shaped curve, whereby this end portion 47 gains stability. This is further increased by a floor 48 which extends between the end of the end portion 47 and the lower end of the base plate 49.

The invention claimed is:

1. A one-piece front panel for a furniture body including movable furniture parts having an end face with a handle bar, permitting the end face to be gripped from behind, the front panel comprising:

a chamber for receiving a lighting device;

a base plate;

a wall connected in front of said base plate, said wall having multiple curvatures and forming a back bone of the one-piece front panel, said wall including a first end portion and a second end portion;

said first end portion extending to said base plate in a direction toward said base plate;

said second end portion extending away from said base plate and carrying said chamber at a spacing from said base plate;

said chamber remaining in front of said base plate, said chamber having a light outlet opening for passing light of the lighting device onto said wall;

said wall forming, with said second end portion, a rear wall of said chamber facing said base plate; and an upper part, standing perpendicularly relative to said base plate connected to an upper edge of said base plate and covering said wall and said chamber.

2. The front panel according to claim 1, wherein said wall and said base plate have portions formed in common.

3. The front panel according to claim 1, which further comprises locking or spacing elements protruding from a back of said base plate for fastening to the furniture body.

4. The front panel according to claim 1, which further comprises:

said upper part having an end;

said chamber having a front wall extended to said end of said upper part or beyond said upper part to an underside of a cover plate of the furniture body.

5. The front panel according to claim 1, wherein said first end portion lies opposite said chamber, said first end portion having an S-shaped curve.

6. The front panel according to claim 1, wherein a floor part is attached between said first end portion and said base plate.

7. The front panel according to claim 1, which further comprises a strip of a transparent material, said strip closing said light outlet opening of said chamber oriented perpendicularly to said wall.

8. The front panel according to claim 1, wherein:

said chamber has mutually opposite walls with grooves formed therein; and at least one of a strip of a transparent material oriented perpendicularly to said wall or an LED band is held in said grooves.

9. The front panel according to claim 1, wherein:

said chamber has mutually opposite walls; and lugs protrude from said mutually opposite walls and engage in grooves formed in at least one of a strip of a transparent material oriented perpendicularly to said wall or an LED band.

10. A furniture piece, comprising:

the front panel according to claim 1; and the handle bar being made of a solid profile having:

a grip recess inserted in a rectangular corner cutout in the end face of the movable furniture part, a lug extending over the end face, and an underside locking element engaging in the furniture part.

* * * * *